US012246425B2

(12) United States Patent
Herritz et al.

(10) Patent No.: US 12,246,425 B2
(45) Date of Patent: Mar. 11, 2025

(54) HAMMER

(71) Applicant: Milwaukee Electric Tool Corporation, Brookfield, WI (US)

(72) Inventors: Devin W. Herritz, Sussex, WI (US); Jared M. Amann, New Berlin, WI (US); James A. Cemke, Jr., Hartford, WI (US); Emelie E. Troedson, Seattle, WA (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/490,474

(22) Filed: Oct. 19, 2023

(65) Prior Publication Data

US 2024/0042588 A1 Feb. 8, 2024

Related U.S. Application Data

(63) Continuation of application No. 17/157,149, filed on Jan. 25, 2021, now Pat. No. 11,826,890, which is a continuation of application No. PCT/US2021/012617, filed on Jan. 8, 2021.

(60) Provisional application No. 62/959,566, filed on Jan. 10, 2020.

(51) Int. Cl.
*B25D 1/04* (2006.01)

(52) U.S. Cl.
CPC .................................. *B25D 1/04* (2013.01)

(58) Field of Classification Search
CPC .................................................. B25D 1/04
USPC ........................................................ 7/146
See application file for complete search history.

(56) References Cited

U.S. PATENT DOCUMENTS

| | | | | |
|---|---|---|---|---|
| 63,106 | A * | 3/1867 | Selsor | B25D 1/04 81/23 |
| 103,660 | A | 5/1870 | Rock | |
| 199,959 | A | 2/1878 | Chapman | |
| 1,807,347 | A | 5/1931 | Schweigert | |
| 2,462,250 | A | 2/1949 | David | |
| 3,130,762 | A | 4/1964 | Kerr | |
| 3,148,716 | A | 9/1964 | Vaughan, Jr. | |
| 3,640,324 | A | 2/1972 | Porter | |
| 3,721,282 | A | 3/1973 | Hayes et al. | |
| 5,996,442 | A | 12/1999 | Carmien | |
| 6,016,722 | A | 1/2000 | Gierer et al. | |
| 6,128,977 | A | 10/2000 | Gierer et al. | |

(Continued)

FOREIGN PATENT DOCUMENTS

| | | |
|---|---|---|
| CA | 2227489 | 9/1999 |
| CN | 201208742 | 3/2009 |

(Continued)

OTHER PUBLICATIONS

International Search Report and Written Opinion for International Application No. PCT/US2021/012617, dated Apr. 23, 2021, 9 pages.

*Primary Examiner* — Hadi Shakeri
(74) *Attorney, Agent, or Firm* — Reinhart Boerner Van Deuren s.c.

(57) ABSTRACT

A tool, such as a hammer, including a surface to strike objects, such as nails, and a mechanism to facilitate the removal of objects, such as staples that have been inserted into wood. In one embodiment the mechanism includes a recess in the hammerhead body and a projection that extends above the recess.

20 Claims, 7 Drawing Sheets

(56) References Cited

U.S. PATENT DOCUMENTS

| | | | |
|---|---|---|---|
| D436,821 | S | 1/2001 | Douglas et al. |
| 6,227,075 | B1 | 5/2001 | Carmien |
| 6,234,048 | B1 | 5/2001 | Carmien |
| D452,126 | S | 12/2001 | Hung |
| 6,435,059 | B1 | 8/2002 | Martinez |
| 6,457,384 | B1 | 10/2002 | Cox et al. |
| 6,463,832 | B1 | 10/2002 | Cox et al. |
| D470,380 | S | 2/2003 | Huang |
| 6,536,308 | B1 | 3/2003 | Thorne et al. |
| D474,667 | S | 5/2003 | Hung |
| 6,595,087 | B2 | 7/2003 | Whalen et al. |
| 6,619,408 | B1 | 9/2003 | Lai |
| 6,763,747 | B1 | 7/2004 | Gierer et al. |
| 6,829,966 | B1 | 12/2004 | Bramuchi |
| D519,348 | S | 4/2006 | Chen |
| D549,064 | S | 8/2007 | Youngren et al. |
| D605,922 | S | 12/2009 | Reinius |
| 7,874,231 | B2 | 1/2011 | Hanlon |
| 7,950,308 | B2 | 5/2011 | Atsumi et al. |
| 8,047,099 | B2 | 11/2011 | St. John et al. |
| 8,056,443 | B2 | 11/2011 | Hanlon |
| 8,104,379 | B2 | 1/2012 | Hanlon |
| 8,141,458 | B1 | 3/2012 | Spencer et al. |
| 8,164,045 | B2 | 4/2012 | Troxell et al. |
| 8,261,634 | B2 | 9/2012 | St. John et al. |
| 8,387,486 | B2 | 3/2013 | Hanlon |
| 8,479,612 | B2 | 7/2013 | Sergyeyenko et al. |
| 8,499,665 | B2 | 8/2013 | St. John et al. |
| 8,534,643 | B2 | 9/2013 | Lombardi et al. |
| 8,770,548 | B2 | 7/2014 | Hanlon |
| 8,833,207 | B2 | 9/2014 | Hanlon |
| D716,126 | S | 10/2014 | Dahlberg |
| 8,893,585 | B2 | 11/2014 | Descombes et al. |
| 9,168,648 | B2 | 10/2015 | Lombardi |
| D742,712 | S | 11/2015 | Zhang et al. |
| 9,193,059 | B2 | 11/2015 | Lombardi et al. |
| D747,943 | S | 1/2016 | Hung |
| 9,233,462 | B2 | 1/2016 | LaPorte |
| D748,447 | S | 2/2016 | Hung |
| D770,254 | S | 11/2016 | Honadel et al. |
| D770,255 | S | 11/2016 | Honadel et al. |
| D770,875 | S | 11/2016 | Honadel et al. |
| D777,549 | S | 1/2017 | Hung |
| D781,123 | S | 3/2017 | Chen |
| D781,124 | S | 3/2017 | Chen |
| D789,760 | S | 6/2017 | Hung |
| 9,682,467 | B2 * | 6/2017 | Harrison ................ B25G 1/102 |
| 9,789,597 | B2 | 10/2017 | West et al. |
| 9,802,304 | B2 | 10/2017 | West et al. |
| D826,024 | S | 8/2018 | Yu |
| 2005/0229322 | A1 | 10/2005 | Chiu et al. |
| 2005/0252345 | A1 | 11/2005 | Carmien et al. |
| 2008/0053278 | A1 | 3/2008 | St. John et al. |
| 2008/0210059 | A1 | 9/2008 | Adams et al. |
| 2009/0056504 | A1 | 3/2009 | Atsumi et al. |
| 2010/0116096 | A1 | 5/2010 | Hanlon |
| 2010/0154598 | A1 | 6/2010 | Sergyeyenko et al. |
| 2010/0199809 | A1 | 8/2010 | St. John et al. |
| 2010/0200737 | A1 | 8/2010 | Troxell et al. |
| 2010/0224031 | A1 | 9/2010 | Hanlon |
| 2011/0079111 | A1 | 4/2011 | Hanlon |
| 2011/0120270 | A1 | 5/2011 | Lombardi et al. |
| 2011/0314970 | A1 | 12/2011 | Chen |
| 2012/0036965 | A1 | 2/2012 | St. John et al. |
| 2012/0085983 | A1 | 4/2012 | Hanlon |
| 2012/0091409 | A1 | 4/2012 | Hanlon |
| 2012/0112144 | A1 | 5/2012 | Hanlon |
| 2012/0119173 | A1 | 5/2012 | Hanlon |
| 2012/0152066 | A1 | 6/2012 | Descombes et al. |
| 2013/0126807 | A1 | 5/2013 | Lombardi et al. |
| 2013/0126808 | A1 | 5/2013 | Lombardi et al. |
| 2014/0001426 | A1 | 1/2014 | Lombardi et al. |
| 2014/0165787 | A1 | 6/2014 | Lombardi |
| 2014/0259695 | A1 | 9/2014 | Guynn et al. |
| 2015/0068366 | A1 | 3/2015 | Lombardi et al. |
| 2015/0107417 | A1 | 4/2015 | LaPorte |
| 2015/0143959 | A1 | 5/2015 | Lin |
| 2015/0231776 | A1 | 8/2015 | Doster |
| 2015/0251303 | A1 | 9/2015 | Flosi et al. |
| 2016/0039078 | A1 | 2/2016 | West |
| 2017/0297189 | A1 | 10/2017 | Lombardi |
| 2018/0001458 | A1 | 1/2018 | West et al. |
| 2019/0255691 | A1 | 8/2019 | Paulsen et al. |

FOREIGN PATENT DOCUMENTS

| | | |
|---|---|---|
| CN | 106142013 | 11/2016 |
| CN | 108527262 | 9/2018 |
| DE | 7336500 | 4/1974 |
| GB | 2489943 | 10/2012 |
| JP | 2004-009237 | 1/2004 |
| JP | 4198395 | 12/2008 |
| TW | D181364 | 2/2017 |

* cited by examiner

HAMMER

CROSS-REFERENCE TO RELATED PATENT APPLICATIONS

The present application is a continuation of U.S. application Ser. No. 17/157,149, filed on Jan. 25, 2021, which is a continuation of International Patent Application No. PCT/US2021/012617, filed Jan. 8, 2021, which claims the benefit of and priority to U.S. Provisional Application No. 62/959,566, filed on Jan. 10, 2020, which are incorporated herein by reference in their entireties.

BACKGROUND OF THE INVENTION

The present disclosure relates generally to the field of tools. The present disclosure relates specifically to a hammer with a projection to facilitate interfacing with other objects, such as staples.

Hammers are used to strike objects, such as to strike a nail into a wooden board. Hammers commonly include a device to interface with other components, such as a device to remove nails.

SUMMARY OF THE INVENTION

One embodiment of the invention relates to a hammer, staple-puller combination tool including a handle including a gripping portion, a body rigidly coupled to the handle, a striking surface at a first end of the body, a rear surface at a second end of the body opposite the first end, an upper surface of the body facing away from the gripping portion, a recess between the upper surface and the rear surface, and a projection. The projection extends from the upper surface towards the rear surface above the recess. The projection has a width dimension and a length dimension and the recess has a length dimension and a depth dimension. The width and the length dimensions of the projection and the length and depth dimensions of the recess are configured to engage a staple.

Another embodiment of the invention relates to a hammer, staple-puller combination tool including a handle including a gripping portion, a body rigidly coupled to the body, a striking surface at a first end of the body, a rear surface at a second end of the body opposite the first end, an upper surface facing away from the gripping portion, and a projection. The projection extends from the upper surface to an end of the projection. The projection extends a first distance away from the striking surface and the rear surface is a second distance from the striking surface further than the first distance.

Another embodiment of the invention relates to a hammer, staple-puller combination tool including a handle including a gripping portion, a body rigidly coupled to the body, a striking surface at a first end of the body, a rear surface at a second end of the body opposite the first end, an upper surface facing away from the gripping portion, a recess between the upper surface and the rear surface, and a projection extending from the upper surface towards the rear surface. The recess extends inwardly into the body with respect to both the upper surface and the rear surface.

Another embodiment of the invention relates to a hand-held tool, such as a hammer, including a handle, and a hammerhead body rigidly coupled to the handle. The hammerhead body includes a striking surface at a first end of the hammerhead body, a recess partially defined by an internal surface that extends from a first edge of the hammerhead body to a second edge of the hammerhead body, and a projection that extends from the first edge over the recess.

In a specific embodiment, the first edge is the transition from a top surface of the hammerhead body to the internal surface of the recess, and the second edge is the transition from a back surface of the hammerhead body at a second end of the hammerhead body opposite the first end. In another specific embodiment, Another embodiment of the invention relates to a hand-held tool, such as a hammer, including a handle and a hammerhead body rigidly coupled to the body. The hammerhead body defines a striking surface and a back surface opposite the striking surface. The hammerhead body includes a projection that does not extend past the back surface. In a specific embodiment the projection extends from a first corner of the hammerhead body, the first corner defining the transition from a back surface of the hammerhead body to a top surface of the hammerhead body.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a hammer and elements thereof are shown. Various embodiments of the hammer discussed herein include an innovative mechanism for the hammer to interface with other objects.

As will be generally understood, a hammer includes a head with a striking surface. Described herein is one or more embodiments of a hammer in which the head also includes a mechanism to facilitate the removal of staples, such as construction staples, that have been applied to objects such as wood, shingles, etc. Combining the functionality of a striking surface with the ability to remove staples in a single tool reduces the number of tools a worker needs to carry and/or interact with, thereby increasing the efficiency of the worker.

Figure 1:
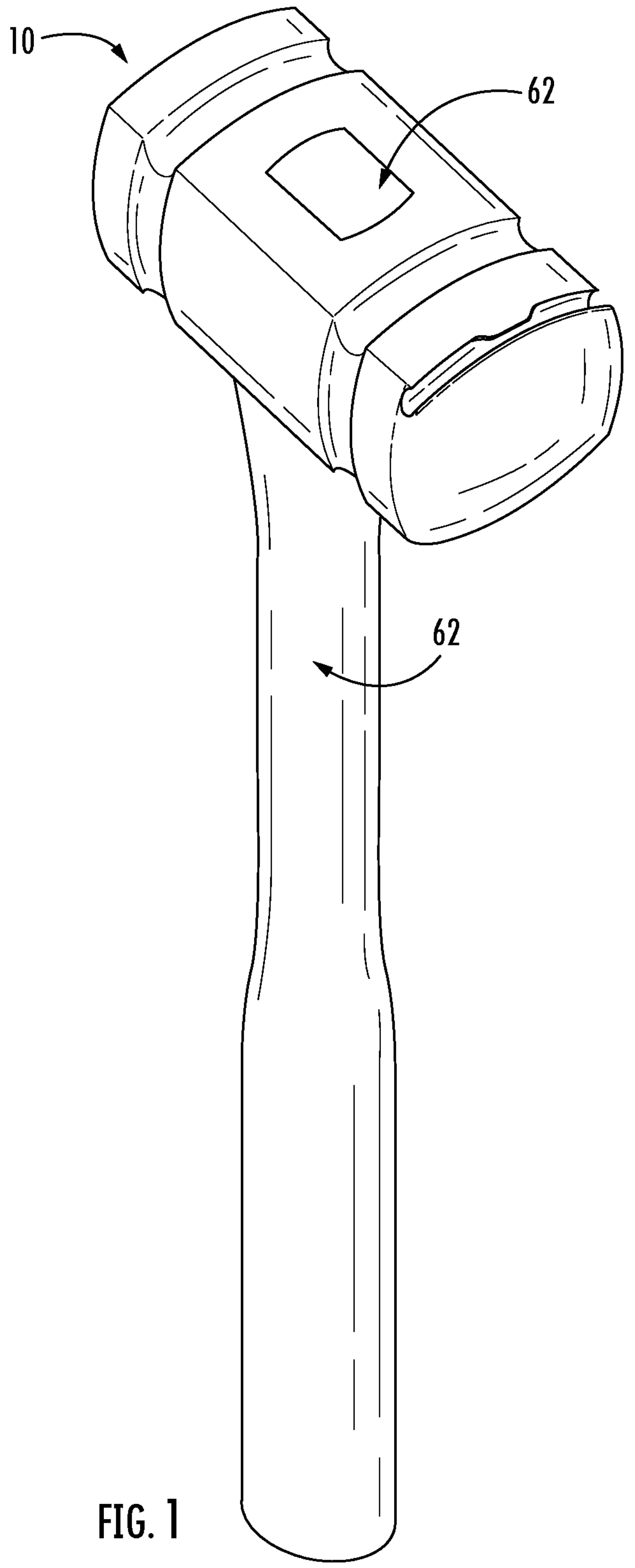
FIG. 1 is a perspective view of a hammer, according to an embodiment.
Figure 2:
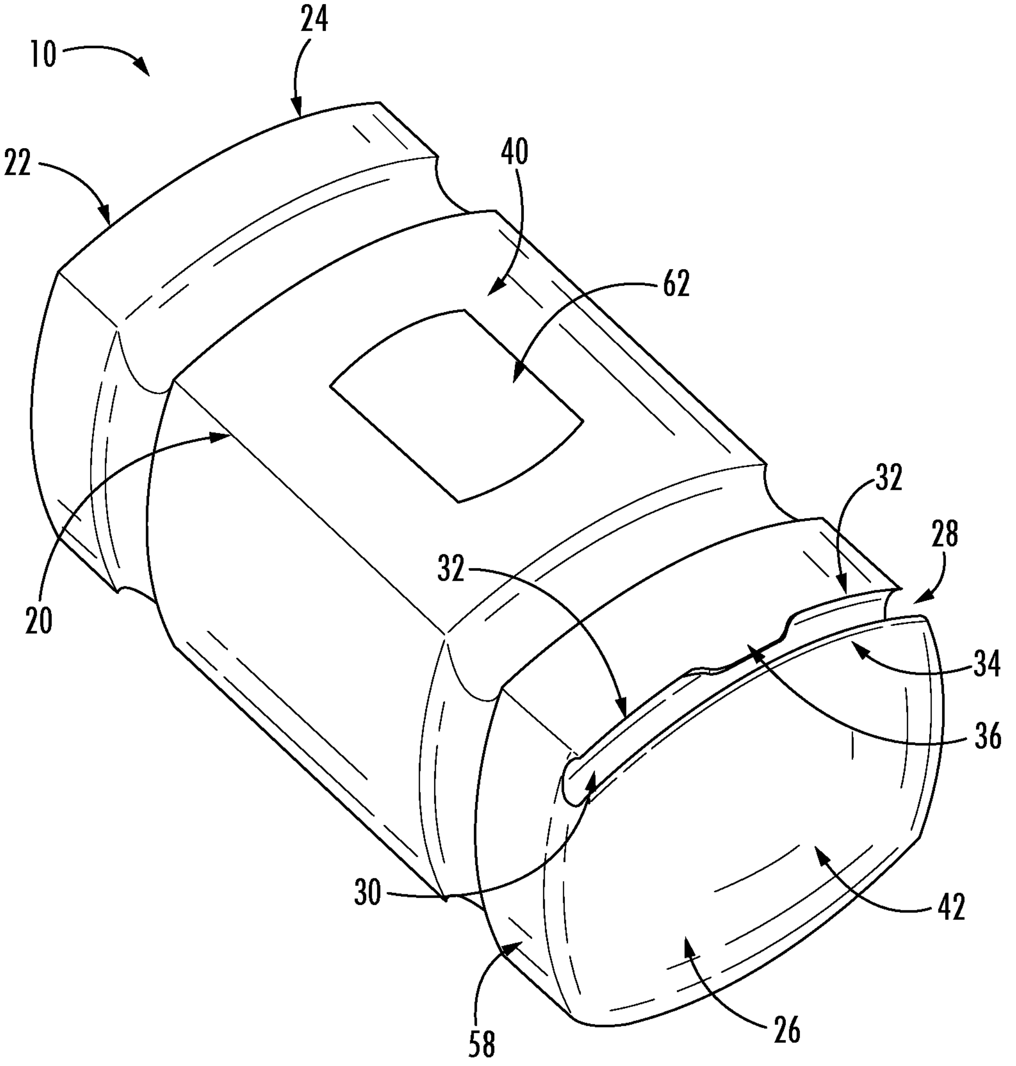
FIG. 2 is a perspective view of the hammer of FIG. 1, according to an embodiment.

Referring to FIGS. 1-2, a device for striking objects, such as hammer 10, is shown according to an exemplary embodiment. In a specific embodiment, hammer 10 is a hammer, staple-puller combination tool. In this exemplary embodiment hammer 10 includes a handle, a shaft or body 62 and hammerhead body 20. In one use, the handle includes a gripping portion that is gripped by a user and rotated so that hammerhead body 20 strikes a desired object. In various embodiments the handle is rubber, fiberglass, wood, plastic, steel, titanium and/or aluminum. Shaft or body 62 is rigidly coupled to hammerhead body 20.

Hammerhead body 20 defines striking surface 22 at first end 24 of hammerhead body 20. Hammerhead body 20 also defines an upper or top surface 40, bottom surface 60, lateral or side surface 58, and a rear or back surface 42. Back surface 42 is at second end 26 of hammerhead body, opposite first end 24. In a specific embodiment, one or more of top surface 40 and bottom surface 60 are planar. In a specific embodiment, top surface 40 faces away from the gripping portion of shaft or body 62.

In a specific embodiment, as shown, recess 28 is defined by internal surface 30, which extends from first edge 32 to second edge 34. Recess 28 is between top surface 40 and back surface 42. Top surface 40 and internal surface 30 each extend from first edge 32, and back surface 42 and internal surface 30 each extend from second edge 34. Projection 36 extends from first edge 32 and top surface 40 towards back surface 42 above recess 28. In one embodiment, recess 28 is cylindrically shaped. In one embodiment, hammerhead body 20 includes channel 80 and channel 82, which circumferentially surround hammerhead body.

In use, projection 36 can be utilized to remove a staple that has been inserted into wood. First a user forcibly pushes projection 36 between the staple and the wood. The user then pivots hammerhead body 20 in direction 64 around axis. As hammerhead body 20 pivots, projection 36 pulls the staple out of the wood until it is entirely and/or at least partially removed from the wood. It will be recognized that the rotation of hammerhead body 20 is not restricted to rotating in direction 64 around axis, and that direction 64 around axis are identified for exemplary purposes only and are not intended to be limiting of how hammer 10 may be used.

In an alternate embodiment, hammerhead body 20 does not define a recess 28 that projection 36 extends over. Instead, projection 36 extends past back surface 42 of hammerhead body 20.

Figure 3:
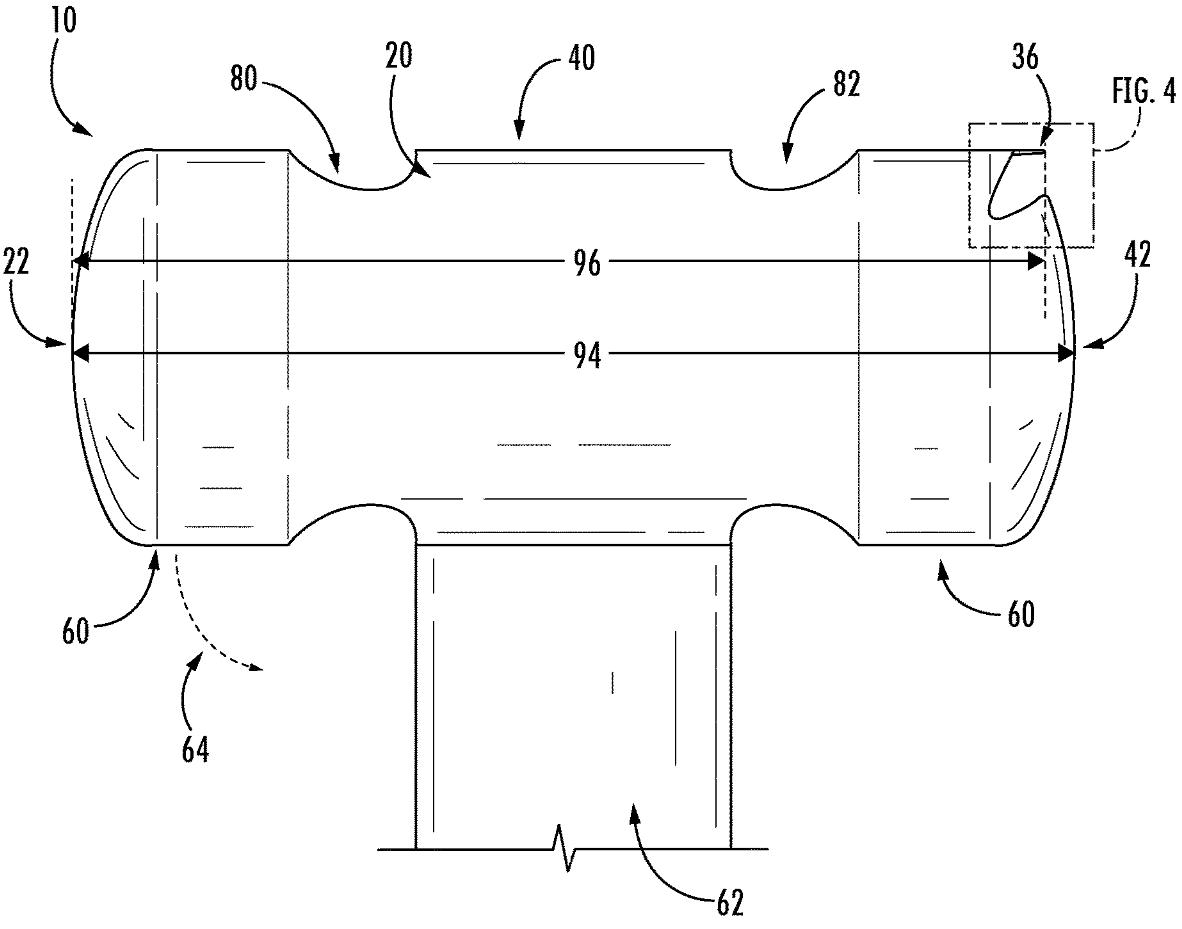
FIG. 3 is a side view of the hammer of FIG. 1, according to an embodiment.

Turning to FIG. 3, projection 36 extends away from striking surface 22 a length 56 from first edge 32. First edge 32 is between top surface 40 of body 20 and recess 28. In a specific embodiment, projection 36 extends above recess 28. Projection 36 comprises top surface 46 and bottom surface 48. Top surface 46 and bottom surface 48 of projection 36 collectively define angle 44 of projection 36.

In one embodiment length 56 is between 3 mm and 15 mm, and more specifically is between 5 mm and 8 mm, and even more specifically is 6 mm. In one embodiment angle 44 is between 7 degrees and 25 degrees, and more specifically is between 9 degrees and 15 degrees, and even more specifically is 11 degrees.

In a specific embodiment, projection 36 extends a first distance 96 away from the striking surface 22 and the back surface 42 is a second distance 94 from the striking surface 22 further than the first distance 96 (FIG. 3).

Figure 4:
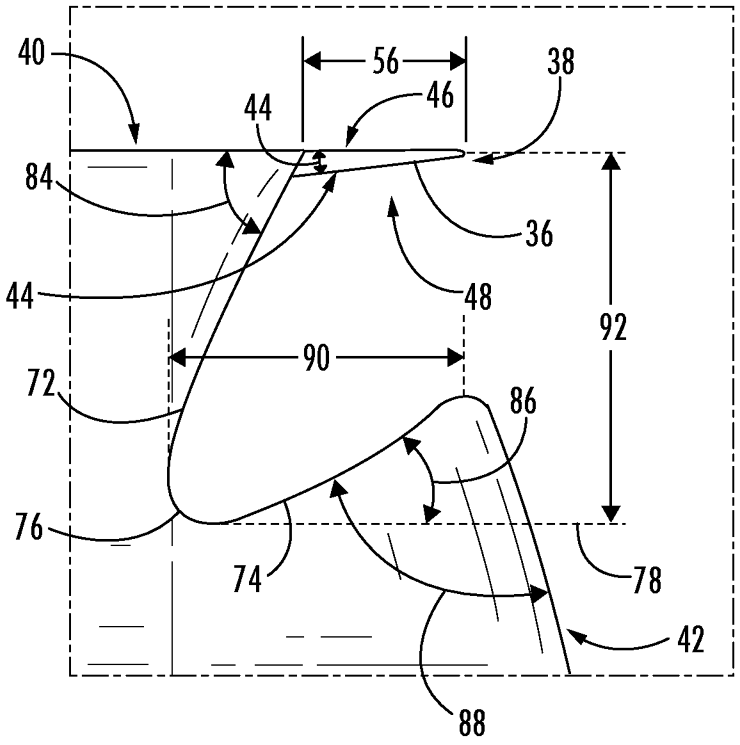
FIG. 4 is a detailed side view of the hammer of FIG. 1, according to an embodiment.
Figure 5:
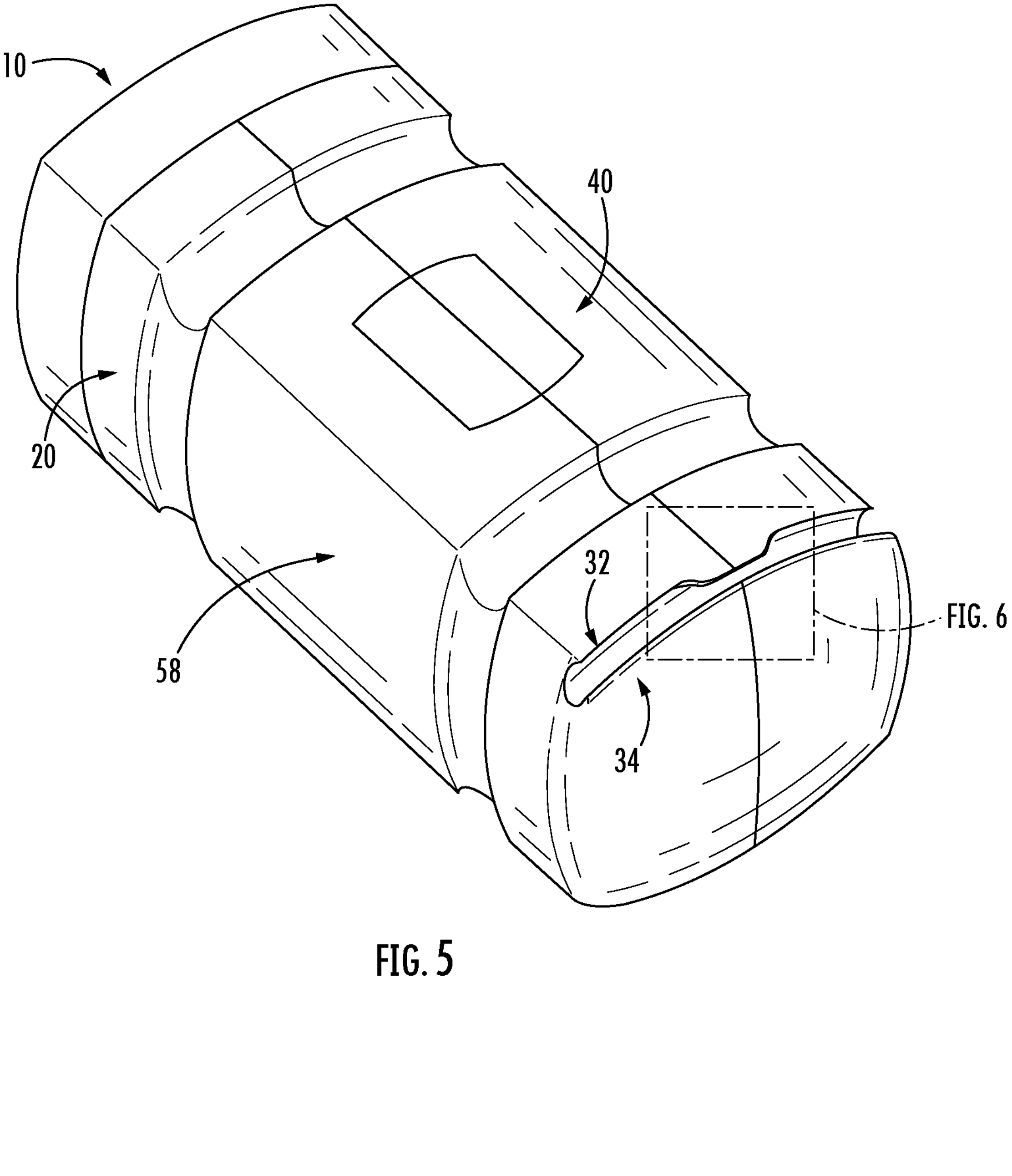
FIG. 5 is a perspective view of the hammer of FIG. 1, according to an embodiment.
Figure 6:
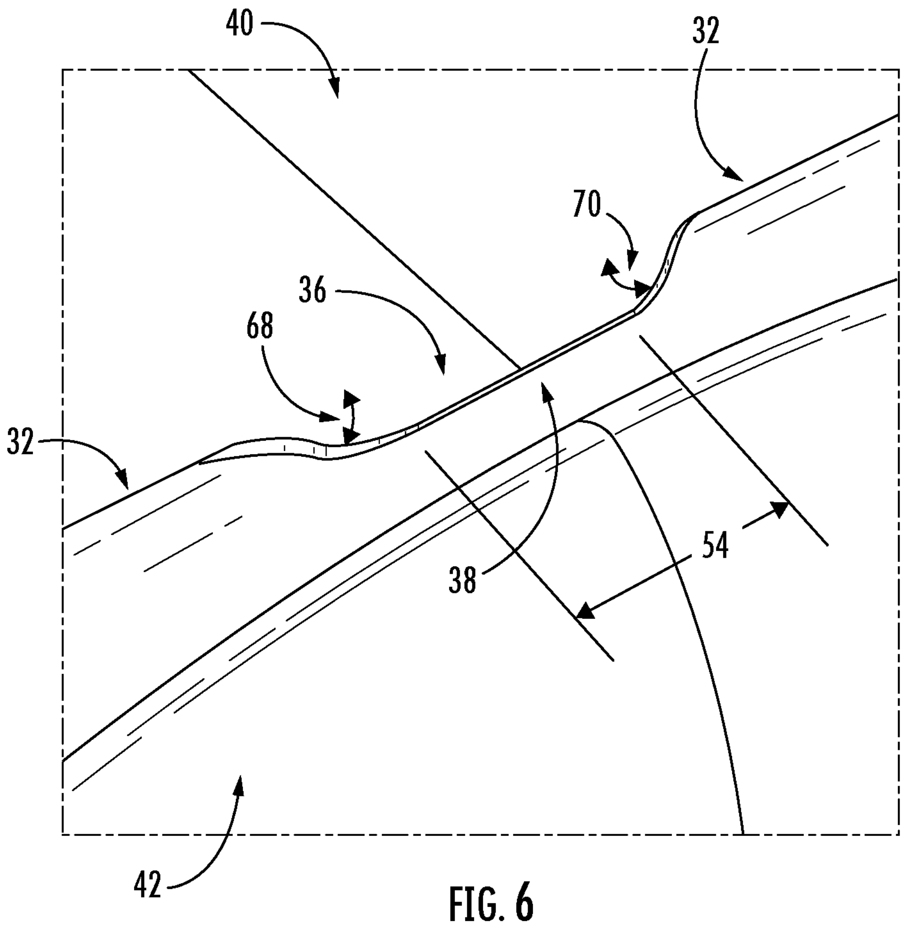
FIG. 6 is a detailed perspective view of the hammer of FIG. 1, according to an embodiment.
Figure 7:
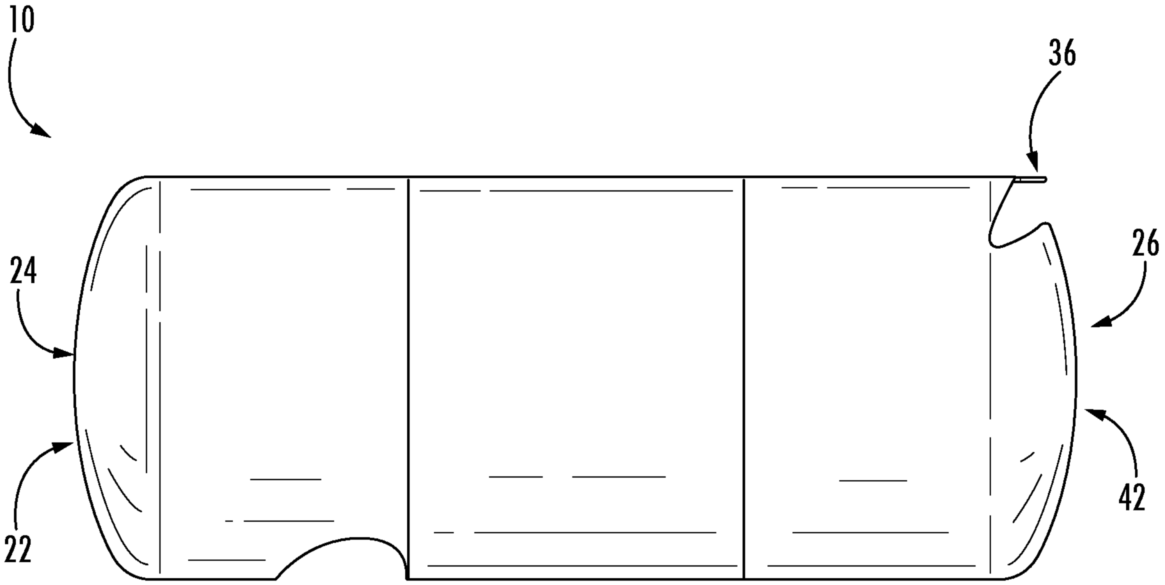
FIG. 7 is a side view of the hammer of FIG. 1, according to an embodiment.

Turning to FIGS. 4-6, in one embodiment projection 36 includes leading edge 38, which is the furthest portion of projection 36 from striking surface 22. Leading edge 38 defines a width 54.

Recess 28 comprises upper surface 72 that extends from top surface 40 of body 20, lower surface 74 that extends from the back surface 42 of body 20, and rounded end surface 76 that extends between upper surface 72 of recess 28 and lower surface 74 of recess 28. Upper surface 72 of recess 28 extends away from top surface 40 of body 20 at angle 84. Lower surface 74 of recess 28 extends away from back surface 42 of body 20 (e.g., from a plane generally parallel to back surface) at angle 88.

Lower surface 74 extends away from rounded end surface 76 towards back surface 42 at angle 86 relative to horizontal plane 78. In a specific embodiment, horizontal plane 78 is generally parallel to top surface 40 and bottom surface 60 of body 20. In a specific embodiment, horizontal plane 78 is perpendicular to shaft or body 62.

In one embodiment angle 84 is between 50 degrees and 80 degrees, and more specifically is between 60 degrees and 70 degrees. In one embodiment angle 86 is between 30 degrees and 55 degrees, and more specifically is between 35 degrees and 50 degrees. In one embodiment angle 88 is between 70 degrees and 110 degrees, and more specifically is between 80 degrees and 100 degrees.

Recess 28 extends inwardly into body 20 with respect to both top surface 40 and back surface 42. Recess 28 extends length 90 in a rearward direction from back surface 42, measured from the transition between upper surface 72 and rounded end surface 76 to the transition between lower surface 74 and back surface 42. Recess extends depth 92 in a downward direction from top surface 40.

In one embodiment width 54 is between 3 mm and 12 mm, and more specifically is between 5 mm and 10 mm, and even more specifically is 8 mm. In one embodiment, projection 36 extends away from top surface 40 of body 20 at angle 68 and angle 70. In one embodiment, angle 68 and angle 70 are between 25 degrees and 65 degrees, and more specifically are between 35 degrees and 55 degrees, and even more specifically are 45 degrees.

In a specific embodiment, projection 36 has a width 54 dimension (FIG. 6) and a length 56 dimension (FIG. 4) and recess 28 has a length 90 dimension (FIG. 4) and a depth 92 dimension (FIG. 4), wherein the width 54 and the length 56 dimensions of the projection 36 and the length 90 and depth 92 dimensions of the recess 28 are configured to engage a staple.

Figure 8:
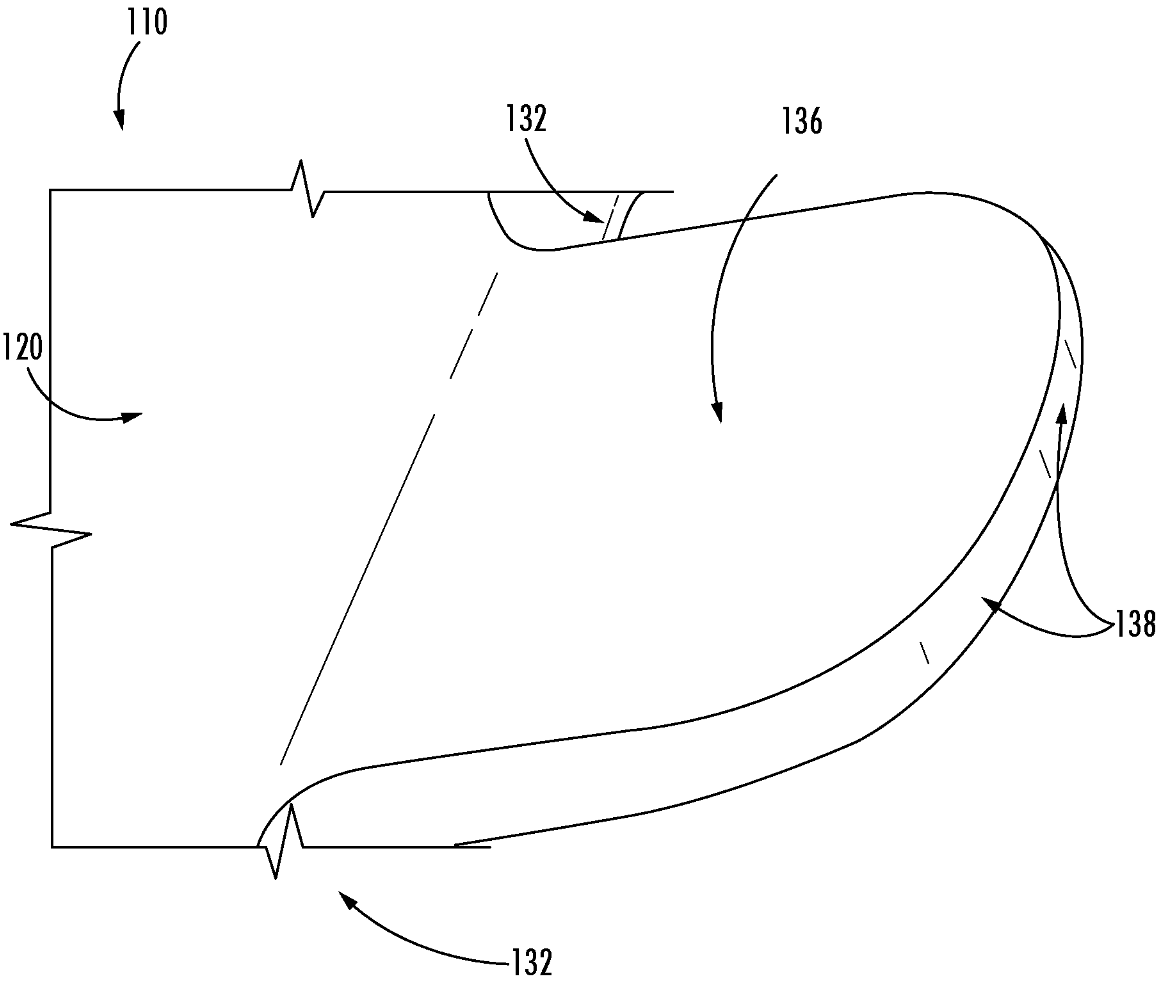
FIG. 8 is a perspective view of a projection on a hammer, according to an embodiment.

Referring to FIG. 8, an exemplary embodiment of hammer 110 comprising body 120 and projection 136 are shown. Hammer 110 and projection 136 are substantially the same as hammer 10 and projection 36, respectively, except for the differences depicted and discussed herein. Projection 136 extends from first edge 132. Projection 136 extends to leading edge 138, which in this instance is concave shaped.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A hammer, staple-puller combination tool, comprising:
- a handle having an outer surface;
- a body coupled to the handle, the body having a first end, a second end opposite the first end, and a top surface facing away from the handle;
- a striking surface at the first end of the body;
- a rear surface at the second end of the body;
- a recess between the top surface and the rear surface; and
- a projection extending from the top surface, away from the handle, and above the recess, the projection having a length extending away from a first edge of the top surface of the body towards the rear surface;
- wherein a portion of the outer surface of the handle faces the second end of the body;
- wherein the projection is spaced a distance from the handle in a direction towards the rear surface such that the entire length of the projection is located between the portion of the outer surface of the handle and the rear surface.

2. The hammer, staple-puller combination tool of claim 1, wherein the projection extends a first distance away from the striking surface, wherein the rear surface is a second distance from the striking surface, and wherein the second distance is greater than the first distance.

3. The hammer, staple-puller combination tool of claim 2, wherein a lower surface of the recess extends away from the rear surface of the body at an angle between 70 degrees and 110 degrees.

4. The hammer, staple-puller combination tool of claim 1, wherein the length of the projection is between 3 mm and 15 mm.

5. The hammer, staple-puller combination tool of claim 1, wherein the projection extends along the first edge of the top surface defining a width, and wherein the width is between 3 mm and 12 mm.

6. The hammer, staple-puller combination tool of claim 1, wherein the recess comprises an upper surface that extends from the top surface of the body, a lower surface that extends from the rear surface of the body, and a curved end surface that extends between the upper surface of the recess and the lower surface of the recess.

7. The hammer, staple-puller combination tool of claim 6, wherein the upper surface of the recess extends away from the upper surface of the body at an angle between 50 degrees and 80 degrees.

8. The hammer, staple-puller combination tool of claim 1, wherein the projection extends in a direction parallel to the top surface of the body.

9. A hammer, staple-puller combination tool, comprising:
- a handle including a gripping portion;
- a body coupled to the handle, the body having a first end, a second end opposite the first end, and a top surface facing away from the gripping portion;
- a striking surface at the first end of the body;
- a rear surface at the second end of the body;
- a recess between the top surface and the rear surface; and
- a projection extending from a first edge of the top surface towards the rear surface and extending above the recess, the projection having a leading edge located opposite from the first edge and a base opposite the leading edge, and a length defined between the base and the leading edge;
- wherein the first edge is spaced a distance from the entirety of the handle in a direction towards the rear surface such that the first edge is positioned between the handle and the rear surface;
- wherein the entire length of the projection is located between the first edge and the rear surface;
- wherein a width of the top surface is greater than a first width of the projection defined by the base, and wherein the width of the top surface is greater than a second width of the projection defined by the leading edge.

10. The hammer, staple-puller combination tool of claim 9, the body further comprising a first side surface located between first end and the second end and located between the top surface and a bottom surface, and a second side surface opposite the first side surface, wherein the projection is spaced a distance from the first side surface and second side surface.

11. The hammer, staple-puller combination tool of claim 9, wherein the leading edge is a first distance away from the striking surface, wherein the rear surface is a second distance from the striking surface, and wherein the second distance is greater than the first distance.

12. The hammer, staple-puller combination tool of claim 9, wherein the length of the projection is between 3 mm and 15 mm.

13. The hammer, staple-puller combination tool of claim 9, wherein the first width is between 3 mm and 12 mm.

14. The hammer, staple-puller combination tool of claim 9, wherein the projection extends in a direction parallel to the top surface of the body.

15. A hammer, staple-puller combination tool, comprising:

a handle having an outer surface;

a body coupled to the handle, the body having a first end and a second end opposite the first end;

a striking surface at the first end of the body;

a rear surface at the second end of the body;

a top surface facing away from the handle, the top surface having a first edge and a second edge;

a recess defined in the top surface of the body and located between the first edge and the second edge; and a projection extending from the first edge towards the second edge above the recess;

wherein the first edge and second edge are located between a portion of the outer surface of the handle that faces the second end of the body and the rear surface, and wherein the first edge is located closer to the handle than the second edge.

16. The hammer, staple-puller combination tool of claim 15, wherein the first edge of the top surface is spaced a distance from the handle in a direction towards the rear surface, and wherein the projection has a length extending away from the first edge of the top surface of the body.

17. The hammer, staple-puller combination tool of claim 16, wherein the length of the projection is between 3 mm and 15 mm.

18. The hammer, staple-puller combination tool of claim 15, wherein the projection extends along the first edge of the top surface defining a width, and wherein the width is between 3 mm and 12 mm.

19. The hammer, staple-puller combination tool of claim 18, wherein the width is between 5 mm and 10 mm.

20. The hammer, staple-puller combination tool of claim 15, wherein the projection comprises a top surface and a bottom surface, wherein the projection defines an angle measured between the top surface and the bottom surface, and wherein the angle is between 7 degrees and 25 degrees.

* * * * *